(12) United States Patent
Brok

(10) Patent No.: US 7,907,938 B2
(45) Date of Patent: Mar. 15, 2011

(54) APPARATUS AND METHOD FOR DATA TRANSMISSION IN A WIRELESS COMMUNICATIONS NETWORK

(75) Inventor: Jacco Brok, Overijssel (NL)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1198 days.

(21) Appl. No.: 11/514,739

(22) Filed: Aug. 31, 2006

(65) Prior Publication Data

US 2008/0056225 A1 Mar. 6, 2008

(51) Int. Cl.
*H04W 88/02* (2009.01)
(52) U.S. Cl. ..................................... 455/412.1
(58) Field of Classification Search .......... 455/450, 455/411, 419, 432, 433, 502, 412.1; 370/252, 370/311, 335, 338; 709/220; 713/151, 169, 713/201
See application file for complete search history.

(56) References Cited

U.S. PATENT DOCUMENTS

| 7,463,890 | B2* | 12/2008 | Herz et al. | 455/445 |
| 2003/0153338 | A1* | 8/2003 | Herz et al. | 455/517 |
| 2005/0177515 | A1* | 8/2005 | Kalavade et al. | 705/52 |
| 2006/0064588 | A1* | 3/2006 | Tidwell et al. | 713/169 |
| 2006/0205406 | A1* | 9/2006 | Pekonen et al. | 455/436 |
| 2006/0258386 | A1* | 11/2006 | Jeong et al. | 455/525 |
| 2007/0008927 | A1* | 1/2007 | Herz et al. | 370/331 |
| 2009/0138599 | A1* | 5/2009 | Allin | 709/226 |

* cited by examiner

*Primary Examiner* — Diane Mizrahi

(57) ABSTRACT

Non-urgent data messages of an IP based application hosted by a cellular device are only transmitted when a predetermined condition is met. A data message may be: a presence report; a check for new email sent by an email client to a server; and a keep-alive message sent to a server, but this is not an exhaustive list of the relevant types of data message. The predetermined condition, may, for example, be met when the first of the following occurs: the airlink is open; a maximum delay time has elapsed; a store for non-urgent messages is full; and a maximum number of messages is stored. The invention reduces the number of times when the airlink is open, thus preventing the 3 to 10 seconds additional open time for each occurrence. This saves battery life for the cellular device. The invention is also applicable to other types of messaging in which small data messages are periodically transmitted over an airlink.

18 Claims, 3 Drawing Sheets

APPARATUS AND METHOD FOR DATA TRANSMISSION IN A WIRELESS COMMUNICATIONS NETWORK

FIELD OF THE INVENTION

The present invention relates to a method of data transmission in a wireless communications network, and apparatus for providing such data transmission. The invention is particularly, but not exclusively, concerned with the transmission of small data messages connected with IP-based applications.

BACKGROUND OF THE INVENTION

Internet Protocol (IP) based applications for cellular devices are emerging and are expected to increase in popularity with the growth of UMTS, EDGE, HSPDA and other telecommunication protocols. A cellular device communicates with the network, and other devices connected thereto, over a wireless connection via a base station or access point. IP-based applications available to cellular devices include ones that enable access to email on remote servers and Instant Messaging, for example, among numerous other functions. Unfortunately, because many applications currently available for cellular devices were designed originally for fixed networks, and then applied to "Wi-Fi" (IEEE 802.11) and then further extended to cellular devices also, they are not necessarily optimized for IP connectivity in a cellular network. This can lead to unacceptable reductions in battery lifetimes for cellular devices, deterring consumers from adopting the applications.

A significant drain on battery capacity is attributable to the wireless connection remaining in an active or "listening" state ("airlink open"), and thus power being consumed by the cellular device, for several seconds following a transmission in either direction over a cellular network. The present inventor has realized that this represents a particularly large overhead when relatively small data packets are to be transmitted frequently, as is typical of the types of data messages associated with various IP-based applications. Modern cellular devices and networks support IP connectivity, for example networks based on GPRS, CDMA-2000 and UMTS technology, in addition to circuit switched voice calls, as carried by GSM and CDMA systems. The cellular network protocols have been designed and optimized for circuit switched voice calls, and not for the "always on" IP connectivity that has been added later. With recurring IP access, network transmitters and receivers are in active states for a much longer time than when they carry only voice calls. This causes a significant drain for battery-powered devices.

The following example is given as an illustration of the relative figures involved, but is not necessarily representative of any specific device. For the purposes of this example, the following assumptions are made: it concerns a cellular device with a battery capacity of 1000 mAH; the device consumes 5 mA during idle time; 100 mA when receiving data (that is, when the airlink is open); and consumes 500 mA when transmitting data (also when the airlink is open). This gives an idle time of 200 hours and a talking time of 2 hours, which is within the parameters of current cellular telephone handsets.

In current wireless communication networks, cellular devices keep the airlink open for about 3 to 10 seconds or so after every data burst that is transmitted or received. The inventor has realized that, consequently, following every transmission or reception of data, of whatever size, the cellular device consumes an additional 100 mA for about 3 to 10 seconds.

Many applications using IP communications involve sending small amounts of data periodically. Some examples of such applications are Instant Messaging (IM), checking for new emails, clients using keep-alive messages and clients supporting "Presence" updates, amongst others, this list not being exhaustive but merely exemplary concerning the type of applications where small amounts of data are transferred. For example, where a user is engaged in an IM conversation and types a message every 5 seconds, it is possible that the airlink may remain open during the entire IM conversation.

An estimate of the effect on battery time of these small data message transmissions is now made to give a comparison with the potential maximum battery lifetime of 200 hours for the example mentioned above. Firstly, assuming that the airlink is kept open for 3 seconds, where data messages are exchanged every 10 minutes, this gives a battery lifetime of 167 hours. Where data messages are exchanged every minute, this leads to a battery lifetime of only 68 hours. An even more dramatic effect occurs if the airlink is kept open for 10 seconds. In this case, the exchange of messages every 10 minutes decreases battery lifetime to 141 hours, and exchanging messages every minute gives a battery lifetime of only 39 hours. Thus, frequent network access may decrease battery lifetime by as much as 80%, in the worse case, but more probably by 24 hours or greater. Not only is this inconvenient and undesirable for consumers, it may also inhibit the introduction of new IP services altogether.

BRIEF SUMMARY OF THE INVENTION

According to an aspect of the invention, a method of data transmission across an airlink in a wireless communications network includes the step of arranging for a non-urgent data message to be transmitted only when a predetermined condition is met. The data message may be associated with an IP application, but in other methods, data messages may be associated with other types of application, or with combinations of different types of application.

By controlling transmission of non-urgent data messages, it is possible to manage the transmission so as to use less power. For example, several non-urgent data messages may be held and transmitted together, in a single burst, when the predetermined condition is met, thus incurring only one associated period of the airlink being open at the end of the transmission. In another example, the predetermined condition may be such that a non-urgent data message is held until a larger data packet, or a data message which is not non-urgent, is to be transmitted, and then arranging for the non-urgent data message to be transmitted in the same burst. Given that many messages sent by IP-based applications may be deemed non-urgent, the invention may give considerable savings in battery consumption compared to previous transmission arrangements.

The invention is particularly advantageous when applied to battery-powered cellular devices, such as, for example, cellular telephones or laptop computers, but may also be applied to non-battery powered devices to reduce power consumption. The method may alternatively, or in addition, be implemented at a base station in a cellular network, for example.

The data message may be one of: a presence report; a check for new email sent by an email client to a server; and a keep-alive message sent to a server, but this is not an exhaustive list of the types of data message to which the invention may relate.

The urgency status of a data message may be determined, for example, by designating a particular class of data messages as being non-urgent. Thus, if a data message included in such a class is to be transmitted, it is automatically delayed until a predetermined condition is met. The class might be, for example, all data messages associated with a particular IP application or, alternatively, certain types of data message associated with a particular IP application. In another approach, an IP application designates its data messages as being urgent or non-urgent. A particular IP message independent of an application, for example POP3 used in connection with email or IM messages, for example, may be designated as non-urgent.

In one method in accordance with the invention, the steps are included of: monitoring the airlink to determine when it is open, and arranging for a non-urgent data message to be transmitted only when the airlink is open. An application may monitor the airlink to determine if it is open for determining when to transmit its messages. Thus, it may cause a data message to only be generated for transmission when it ascertains that the airlink is open. The airlink is open when a communicating device is in an active state, such that it able to receive or transmit data.

In another method in accordance with the invention, the steps are included of: providing a data message for transmission; designating the urgency of the message; and, when the message is designated as non-urgent, storing it until the predetermined condition is met, whereupon it is transmitted. Thus, the message transmission is delayed until a suitable time. As mentioned above, the urgency may be automatically designated simply by a data message belonging to a certain class of data messages deemed to be non-urgent. A data message may be marked by an IP-based application, for example, with its urgency.

The predetermined condition may be one of: that the airlink is open; that a maximum delay time has elapsed; that a store for storing data messages is full; and that a maximum number of messages is held in a store. A single one only of these predetermined conditions may be used in a method in accordance with the invention. For example, only the predetermined condition that the airlink is open may be applied in one method. Another method in accordance with the invention may apply any two or three, or all, of these predetermined conditions. Different predetermined conditions may be applied for data messages associated with different applications installed on a single cellular device. Also, a different predetermined condition may apply to one data message, or one type of data message, than another, even though they are associated with the same IP application, say. Thus, each of a plurality of data messages may be associated with a respective predetermined condition.

Where the predetermined condition is that a maximum delay time has elapsed, a data message may be marked with the maximum delay by an associated application, or a certain type of data message may always be deemed to have a particular maximum delay time, for example. Then, when the delay time expires, transmission is no longer delayed and the data message is transmitted.

In one method in accordance with the invention, the predetermined condition is met when the first of the following occurs: the airlink is open; a maximum delay time has elapsed; storage for non-urgent messages is full; and a maximum number of messages is stored.

A non-urgent data message may be held in a store until transmission, in which case, the predetermined condition may be, or may include, that a maximum number of messages is held in the store.

In one method in accordance with the invention, when the predetermined condition is met, all of the stored data messages are transmitted. In an alternative method, only one, or some, of the stored data messages are transmitted. For example the data message that has been stored for the longest time may be transmitted, or messages of a particular type, such as presence messages, may be given precedence for transmission.

According to an aspect of the invention, a method of data transmission across an airlink in a wireless communications network includes the steps of: classifying data packets to be transmitted into urgent and non-urgent data messages, and arranging for non-urgent data messages to be transmitted only when a predetermined condition is met.

According to another aspect of the invention, a device for transmitting data across an airlink in a wireless communications network comprises: a monitor for monitoring when a predetermined condition is met; and means for transmitting a non-urgent data message only when said predetermined condition is met. In one embodiment, the predetermined condition is met when the first of the following occurs: the airlink is open; a maximum delay time has elapsed; a store for non-urgent messages is full; and a maximum number of messages is stored. The data message may be associated with an IP application hosted by the device. In other embodiments, only one of these occurrences is the predetermined condition. In another alternative embodiment, a combination of two or more of them is applied.

BRIEF DESCRIPTION OF THE DRAWINGS

Some methods and embodiments in accordance with the present invention will now be described by way of example only, and with reference to the accompanying drawings, in which.

DETAILED DESCRIPTION OF THE DRAWINGS

Figure 1:
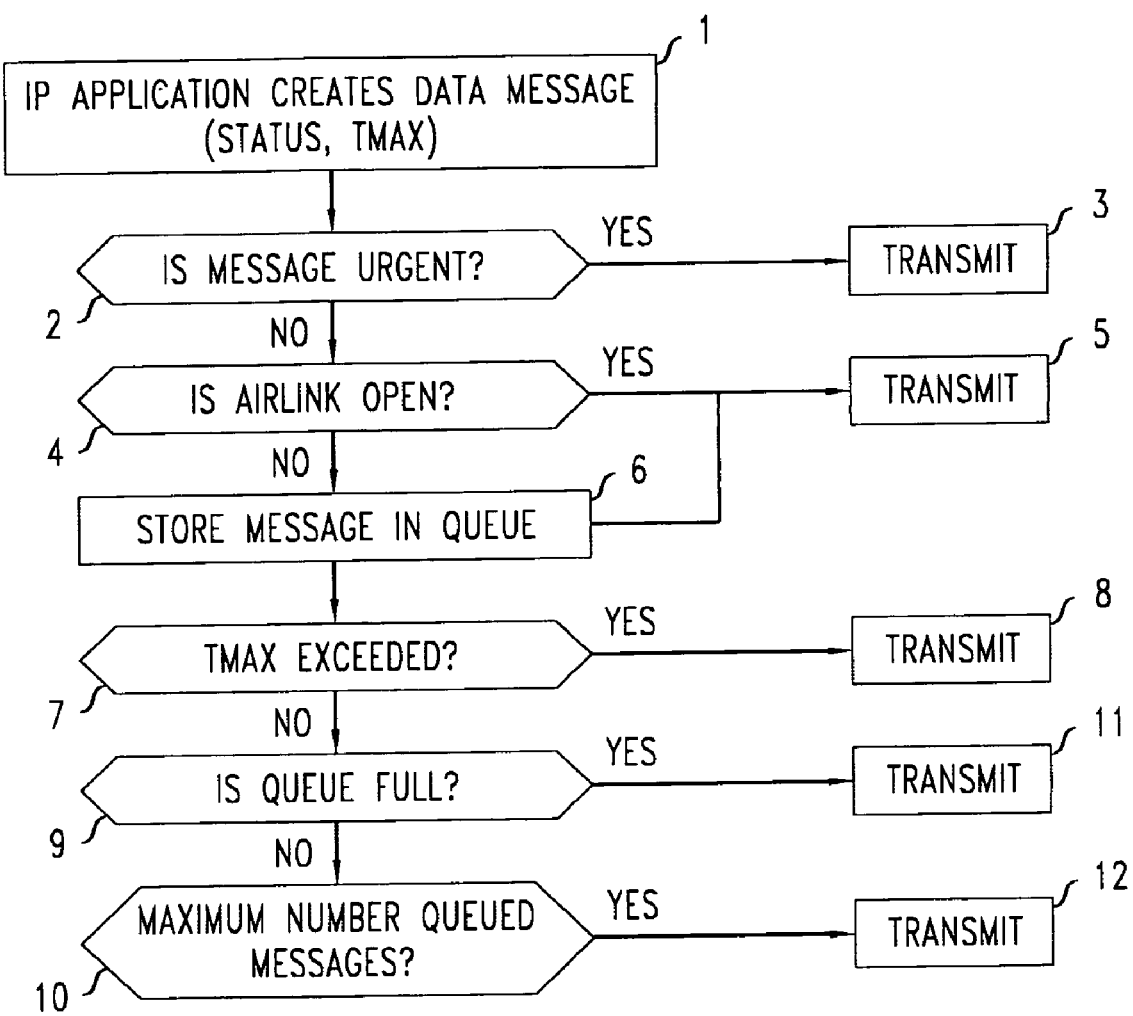
FIG. 1 schematically illustrates a method in accordance with the invention.

With reference to FIG. 1, an IP application installed on a cellular handset is required to send reports indicative of presence to a remote server over an airlink in a wireless communications network. The IP application creates a data message, shown at 1, and marks it with a 'non-urgent' flag as it is not necessary for the message to be transmitted immediately. The IP application also marks the message with a maximum delay time, Tmax. The message must be transmitted when this delay time expires if it has not already been sent.

At 2, the message is examined for urgency. If it is found not to be marked with a 'non-urgent' flag, then it is sent for immediate transmission at 3.

The status of the airlink is continuously monitored by the cellular device, indicated by step 4. If the airlink is determined to be open then the message is transmitted immediately, shown at 5.

If a 'non-urgent' flag is detected for the message, which in this particular example it is, and the airlink is not open, the message is stored in a queue at 6 with other non-urgent data messages awaiting transmission.

For each data message having a maximum delay time, this is monitored at step 7, and when the time has expired for a message, that message is transmitted, as indicated at 8.

Also, whenever a new message has been added to the queue 6, the queue is checked to see if it is full, at 9, or if it holds the maximum number of messages, at 10. If the queue is full, then some of the stored data messages are transmitted at 11, and if the maximum number of messages is in the queue, then some of them are transmitted at 12.

Although the steps 5, 7, 9 and 10 are shown sequentially, they may be carried out in parallel, or sequentially in an order different to that shown. Steps 2 and 4 may also be carried out in reverse order.

Also, if the airlink is found to be open, all of the data messages stored in the queue at that time are transmitted.

The method of FIG. 1 is also applied to data messages generated by other IP applications installed on the cellular device. Data messages from different IP applications are held in the same queue. In other arrangements, multiple queues may be provided for storing data messages.

Figure 2:
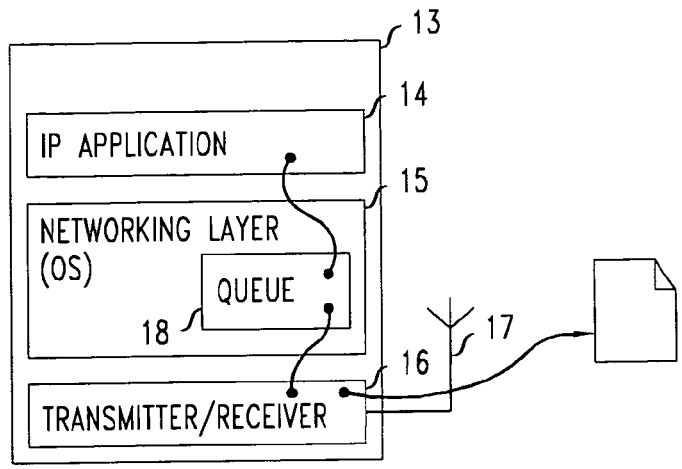
FIG. 2 schematically illustrates an apparatus for carrying out the method illustrated in FIG. 1.

FIG. 2 schematically shows the battery-powered cellular device 13 mentioned with reference to FIG. 1. The device 13 hosts an IP application 14, a networking layer (OS) 15 in the operating system of the device 13, and a transmitter/receiver unit 16 with an antenna 17. The OS 15 contains the queue 18. The application 14 sends a non-urgent message to the OS 15, which sends the message immediately via the transmitter/receiver unit 16 and antenna 17 if the airlink is open. Otherwise the message is stored at 18 and transmitted when one of the predetermined conditions set out with respect to FIG. 1 is met, at which time it is transmitted.

Figure 3:
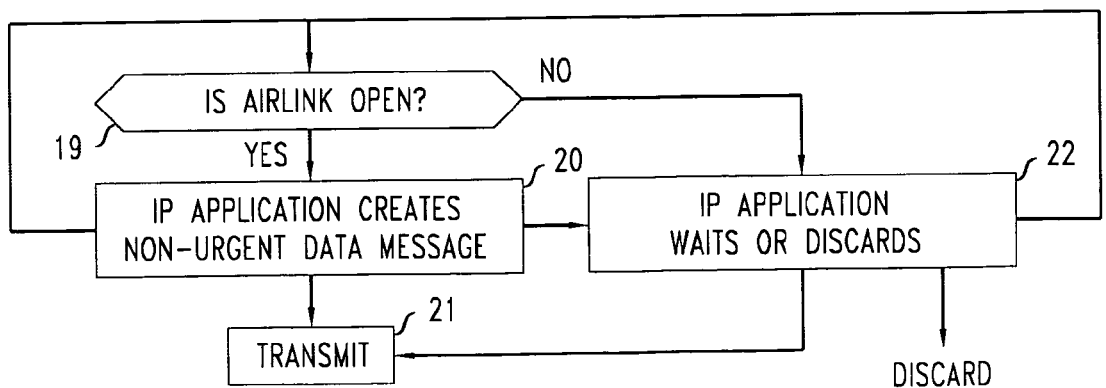
FIG. 3 schematically illustrates another method in accordance with the invention.

In another method in accordance with the invention, shown in FIG. 3, an IP application monitors if the airlink is open at 19. If it detects that the airlink is open, it creates a non-urgent data message at 20, which is then immediately sent for transmission at 21. If the airlink is not open, the application either, at its discretion, waits a specific time before checking again if the airlink is open or discards the non-urgent message, shown at 22. If a certain amount of time has elapsed, when it is not appropriate to discard the data message, the application may generate a non-urgent message for transmission even if the airlink is not open.

Figure 4:
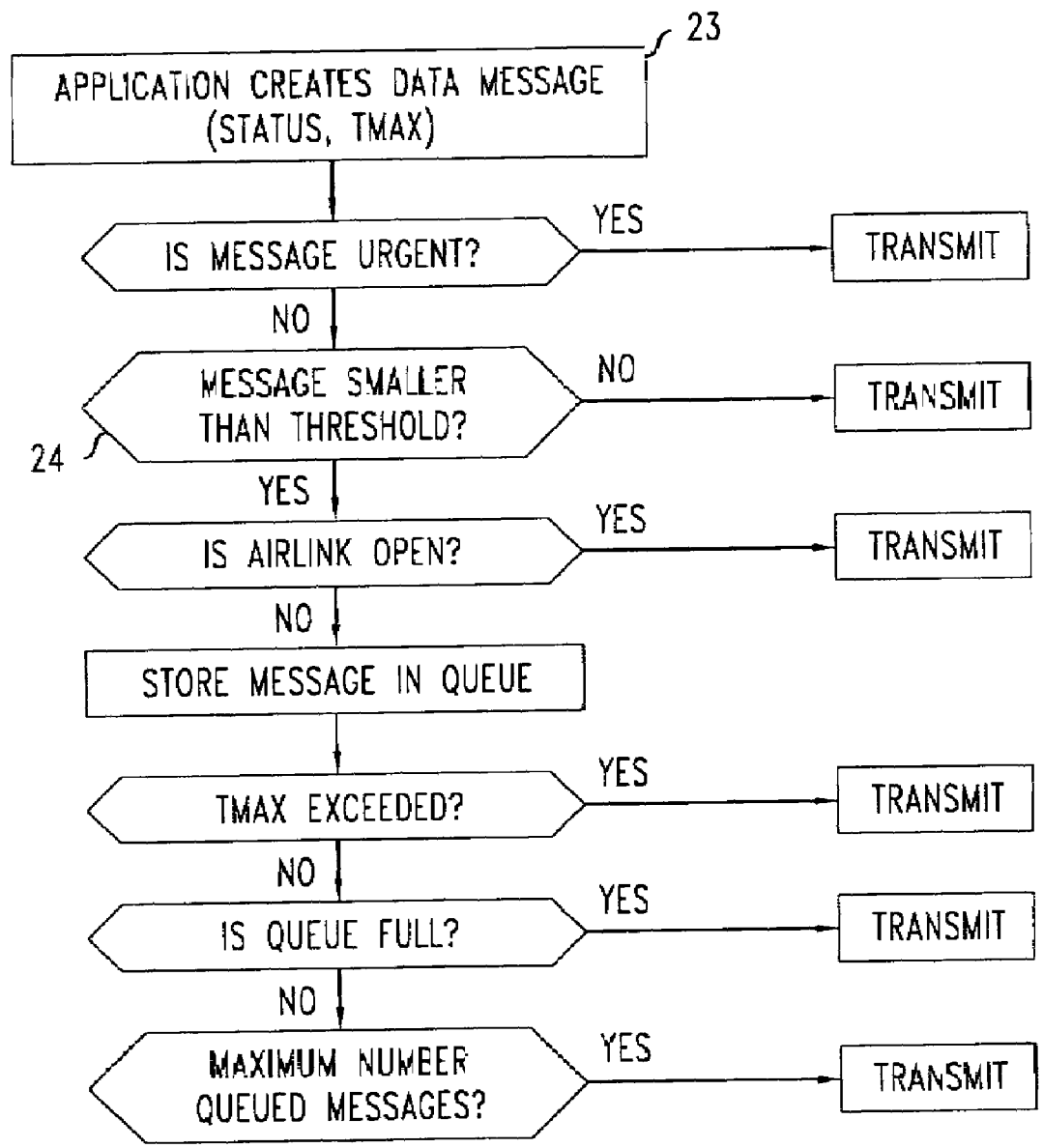
FIG. 4 schematically illustrates yet another method in accordance with the invention.

Another method in accordance with the invention is shown in FIG. 4. Most of the steps are similar to that shown in FIG. 1 and are not described again. However, in this example, the application which creates a data message at 23 is not an IP based application. An additional step is included at 24 where the message is examined to determine if it is smaller than a threshold size. If it is smaller, then the message is treated in the same manner as the messages associated with IP-based applications described above in respect of FIG. 1. The first three decision steps of this method may be carried out in any order. The threshold size step at 24 may be omitted in other methods in accordance with the invention.

Messages from non-IP-based and IP-based applications may be stored in the same queue if the applications are installed on the same cellular device.

The device shown in FIG. 2 may also, or alternatively, be arranged to carry out the methods shown in FIG. 3 and/or in FIG. 4.

The present invention may be embodied in other specific forms or implemented using other methods without departing from its spirit or essential characteristics. The described embodiments and methods are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method of data transmission across an airlink in a wireless communications network, including: a device providing a data message for transmission by a transmitter; a processor designating the urgency of the message; and, when the message is designated as non-urgent, storing the message in a store until a predetermined condition is met, whereupon the message is transmitted by the transmitter.

2. The method as claimed in claim 1, wherein the data message is associated with an Internet Protocol application.

3. The method as claimed in claim 1, further including: monitoring the airlink to determine when the airlink is open, and arranging for a non-urgent data message to be transmitted by the transmitter only when the airlink is open.

4. The method as claimed in claim 1, wherein monitoring the airlink is carried out by an application to determine when to transmit messages of the application.

5. The method as claimed in claim 1, wherein the predetermined condition is that the airlink is open.

6. A method as claimed in claim 1, wherein the predetermined condition is that a maximum delay time has elapsed.

7. The method as claimed in claim 6, wherein a non-urgent data message is associated with an application and the application marks the message with a maximum allowed delay time.

8. The method as claimed in claim 1, wherein a non-urgent data message is associated with an application and the application marks the message to designate the urgency of the message.

9. The method as claimed in claim 1, wherein the predetermined condition is that the store for storing non-urgent data messages is full.

10. The method as claimed in claim 1, wherein the predetermined condition is that a maximum number of non-urgent messages is held in the store.

11. The method as claimed in claim 1, wherein, when the predetermined condition is met, all the stored messages in the store are transmitted by the transmitter.

12. The method as claimed in claim 1, wherein the predetermined condition is met when the first of the following occurs: the airlink is open; a maximum delay time has elapsed; the store for non-urgent messages is full; and a maximum number of messages is stored.

13. The method as claimed in claim 1, wherein each of a plurality of data messages is associated with a respective predetermined condition.

14. The method as claimed in claim 1, wherein the data message is one of: a presence report; a check for new email sent by an email client to a server; and a keep-alive message sent to a server.

15. The method as claimed in claim 1, wherein a message is deemed to be non-urgent when the message is included in a particular class of messages.

16. The method as claimed in claim 1, further including determining the urgency of data messages associated with an application and intended to be sent at intervals over a period of time.

17. The method as claimed in claim 1, wherein the data message is for transmission by a cellular device.

18. The method as claimed in claim 1, wherein the data message is for transmission by a battery-powered device.

* * * * *